(12) United States Patent
Knopp

(10) Patent No.: US 6,886,450 B2
(45) Date of Patent: May 3, 2005

(54) ACTIVATION DEVICE FOR A PISTON/ CYLINDER UNIT WHICH CAN BE INHIBITED

(75) Inventor: Axel Knopp, Eitelborn (DE)

(73) Assignee: Stabilus GmbH, Koblenz (DE)

( * ) Notice: Subject to any disclaimer, the term of this patent is extended or adjusted under 35 U.S.C. 154(b) by 101 days.

(21) Appl. No.: 10/233,790

(22) Filed: Sep. 3, 2002

(65) Prior Publication Data

US 2003/0047978 A1 Mar. 13, 2003

(30) Foreign Application Priority Data

Sep. 3, 2001 (DE) .......................................... 101 42 884

(51) Int. Cl.⁷ .................................................. F16F 9/02
(52) U.S. Cl. ...................... 91/437; 91/464; 297/362.13
(58) Field of Search .................... 91/437, 464; 92/85 B, 92/181 R, 181 P; 297/344.19, 362.13

(56) References Cited

U.S. PATENT DOCUMENTS

| | | | |
|---|---|---|---|
| 3,390,616 A | * 7/1968 | Hammer ..................... 92/85 B |
| 4,844,392 A | 7/1989 | Bauer et al. | |
| 5,235,896 A | 8/1993 | Huber ........................... 91/44 |
| 5,404,972 A | 4/1995 | Popjoy et al. | |
| 5,743,591 A | * 4/1998 | Tame ..................... 297/362.13 |
| 5,779,312 A | * 7/1998 | Nagai et al. ............ 297/362.13 |
| 6,120,237 A | * 9/2000 | Cummings et al. ........... 91/437 |
| 6,241,316 B1 | * 6/2001 | Jean et al. ............. 297/344.19 |

FOREIGN PATENT DOCUMENTS

| | | | |
|---|---|---|---|
| DE | 1 288 263 | 1/1969 | |
| DE | 36 15 688 A1 | 11/1987 | ............ A47C/3/30 |
| DE | 37 38 298 A1 | 7/1988 | |
| EP | 0 505 349 B2 | 5/1998 | ............ F15B/13/01 |
| GB | 2 304 036 A | 3/1997 | ............ A47C/1/024 |
| WO | WO 96/15390 | 5/1996 | |

* cited by examiner

Primary Examiner—Thomas E. Lazo
(74) Attorney, Agent, or Firm—Cohen, Pontani, Lieberman & Pavane

(57) ABSTRACT

A piston/cylinder unit having a selectively inhibited movement includes a cylinder filled with a hydraulic medium and a piston arranged on a piston rod and dividing the cylinder into working spaces. A flow connection system having a flow connection is arranged between the first and second working spaces. The flow connection system includes an on-off valve having a movable valve element which opens the flow connection as a function of a position of the movable valve element. The flow connection system further includes a load-dependent valve arranged in series with the on-off valve for inhibiting complete flow through the flow connection independently from the on-off valve when a load on the piston/cylinder unit is lower than an inhibiting load.

13 Claims, 5 Drawing Sheets

ACTIVATION DEVICE FOR A PISTON/CYLINDER UNIT WHICH CAN BE INHIBITED

BACKGROUND OF THE INVENTION

1. Field of the Invention

The invention relates to an activation device for a piston/cylinder unit having a selectively inhibited movement, in particular for a gas spring which can be selectively inhibited including a cylinder, a piston on a piston rod, the piston dividing the cylinder into two working spaces filled with a hydraulic medium, and a flow connection system between the working spaces including an on/off valve.

2. Description of the Prior Art

Gas springs which have a selectively inhibited movement are employed, for example, in chairs which have a seat back which is spring-supported and can be rigidly held by an inhibiting function of the gas spring. A chair user does not, however, continuously adopt the same posture on the chair. The seat back position can be very easily matched to the instantaneous sitting position by an activation device. Furthermore, the user seated in the chair may also lean forward so that the seat back has no contact with the user's back. If the activation device for the gas spring on the seat back is actuated when the user is leaning forward, the seat back is accelerated by the gas spring toward the user's back and may impact the user's back. This operational behavior is unidesireable. DE 69 35 911 U1 describes a gas spring which has a divided activation push-rod, a spring being arranged between the two activation push-rod sections. Slower opening of the inhibiting valve within the gas spring is achieved by using the spring A similar approach is described in DE 36 15 688 A1 in which a valve cross section changes over the stroke path of the activation push-rod. The throttling associated with this only permits the piston rod to extend slowly at the beginning of the stroke path of the valve and then increasingly rapidly near the end of the stroke path. Although an unpleasant contact with the seat back is weakened by both of the above mentioned prior art types of gas springs, the undesireable behaviour is not reliably prevented.

GB 2 304 036 (GB '036) discloses a seat with an adjustable back and describes an activation device which has two switching inputs. The activation push-rod of the activation device may be activated by a Bowden cable. In addition, the seat support is likewise in effective connection with the activation device such that, in the case of an unloaded seat support, the uninhibited operating function is always adopted on the gas spring independently of the switching condition of the Bowden cable. An activation appliance, which acts directly on the activation push-rod and which is embodied as a rocker arm is used for this purpose. An essential feature of the described activation device is that the seat panel for detecting the loading condition is required to carry out a pivoting motion which imposes a limitation on the chair design. Comfortable chairs often feature a seat inclination adjustment. However, this type of seat inclination adjustment would have a substantial influence on the function of the activation device disclosed by GB '036.

SUMMARY OF THE INVENTION

The object of the present invention is to provide a piston/cylinder unit, particulary a gas spring, having selectively motion which is independent of the stroke of the piston/cylinder unit.

According to the invention, the object is achieved by the arrangement of a load-dependent valve in series with an on-off valve in a flow connection system between the working chambers of a piston/cylinder unit which inhibits the complete flow connection system independently of the switching position of the on-off valve when the load on the piston/cylinder unit is below a non-inhibiting load on the piston/cylinder unit.

The load-dependent valve "senses" whether the person exerts at least a small load on the seat back. If the load is applied, i.e., the user leans on the seat back, the seat back is prevented from contacting the user's back in an uncontrolled manner when the on-off valve is actuated because the contact with the user's back is already made.

For "sensing" the load, the load-dependent valve has a control pressure connection to a working space. A counteracting force which may, for example be applied by a spring is used as a reference parameter.

Instead of using a spring to produce the counteracting force, the load-dependent valve may have a control pressure connection for each of the two working spaces, the control pressures acting in opposite directions. The advantage of this embodiment consists in the fact that in the case of a piston/cylinder unit designed as a gas spring, compensation—in terms of the function according to the invention—is provided for the temperature behavior of the gas in the work spaces.

The load-dependent valve and the on-off valve may be combined to form a structural unit with respect to the piston/cylinder unit, the structural unit may be arranged internally which provides a simple construction and complete design freedom for the desired application.

In this arrangement, a flow duct of the on-off valve may emerge as a section of the flow connection system at the control pressure connection of the load-dependent valve.

As an alternative, the load-dependent valve may also be embodied in the structural form of a non-return valve. In this way, the functional construction of the load-dependent valve can be kept particularly simple.

With a view to a space-saving construction which is favorable in terms of costs, the on-off valve has a valve element, which is respectively exposed on its two control pressure sides to an operating pressure of a working space. Furthermore, the valve element may be formed by a seal.

With a view to a specific return force of the valve element, the seal is embodied so that it can be moved axially, at least on a section of its periphery.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
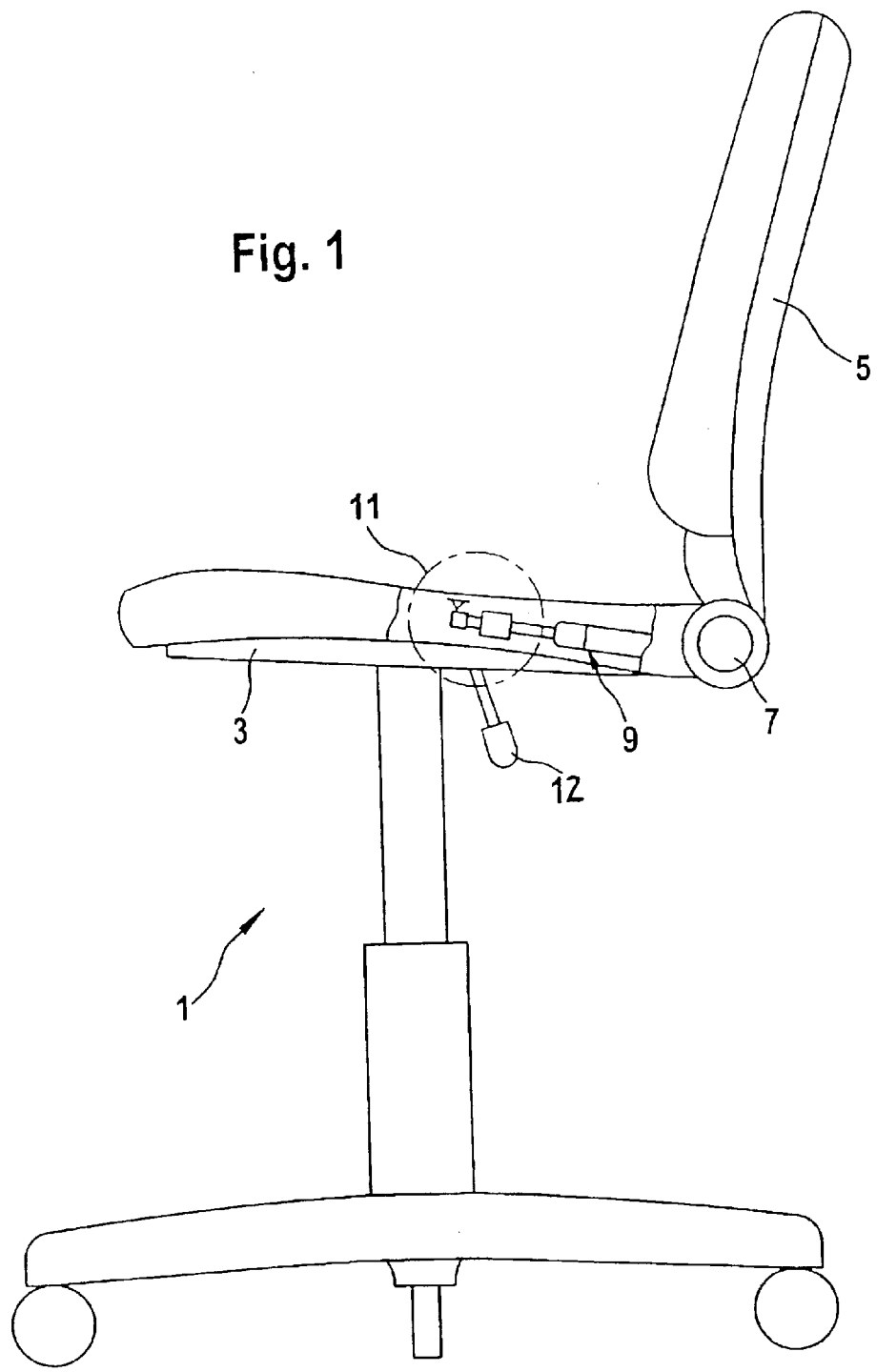
FIG. 1 is a side view of a seat including the piston/cylinder unit according to an embodiment of the present invention.

FIG. 1 shows a chair 1 having a seat carrier 3 and a seat back 5 supported on the seat carrier 3 so that the seat back is pivotable about a bearing 7. A piston/cylinder unit 9 designed as a gas spring is functionally arranged between the seat back 5 and the seat carrier 3. An activation device 11 including an actuating lever 13 is used to switch the gas spring 9 between a movement inhibiting position and a movement enabling position.

Figure 2:
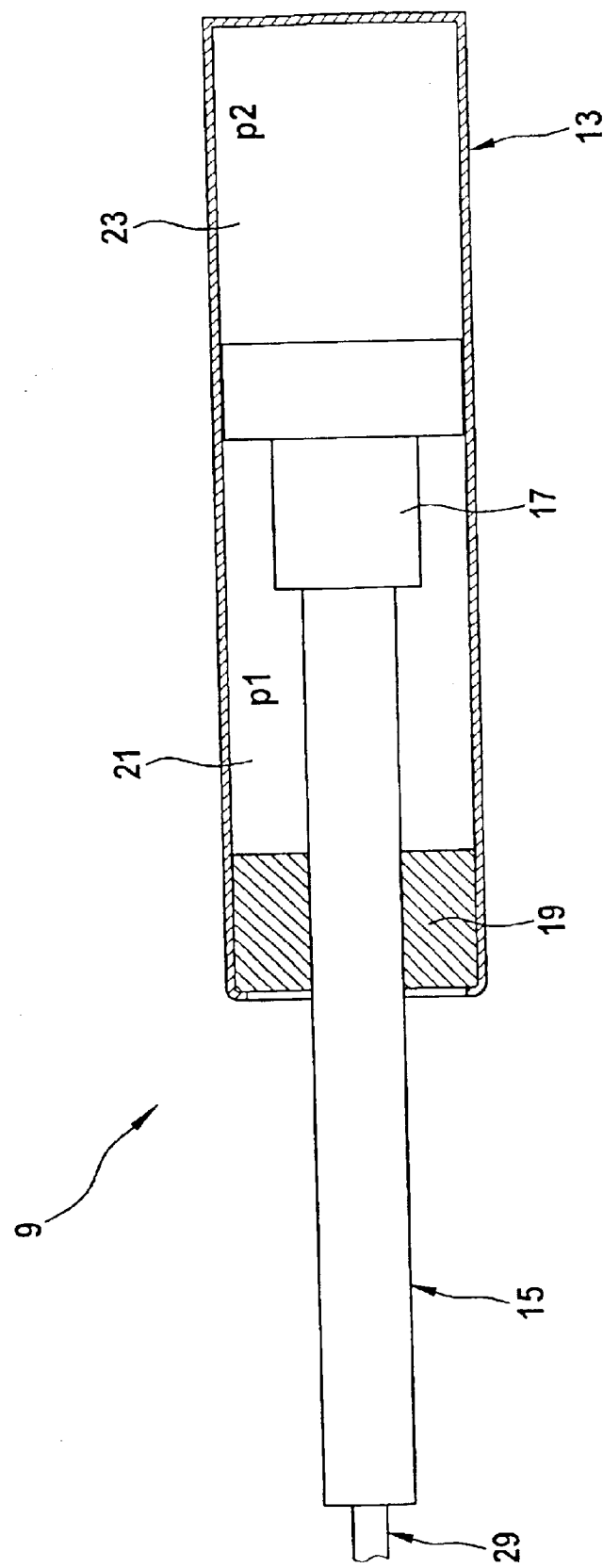
FIG. 2 is a diagrammatic representation of the piston/cylinder unit according to the present invention.

The gas spring 9 is illustrated in a diagrammatic representation in FIG. 2. A piston rod 15 with a piston 17 is arranged so that it can move axially within a cylinder 13. A piston-rod guide 19 seals the cylinder 13 so that the cylinder is divided into two working spaces 21, 23, one working space 21 on the side of the piston rod and the other working space 23 remote from the piston rod. Both of the working spaces are filled with a pressure medium such as, for example, gas. A hydraulic fluid filling may also be used instead of a gas and the contents of the working spaces 21, 23 may be pre-pressurized.

Figure 3:
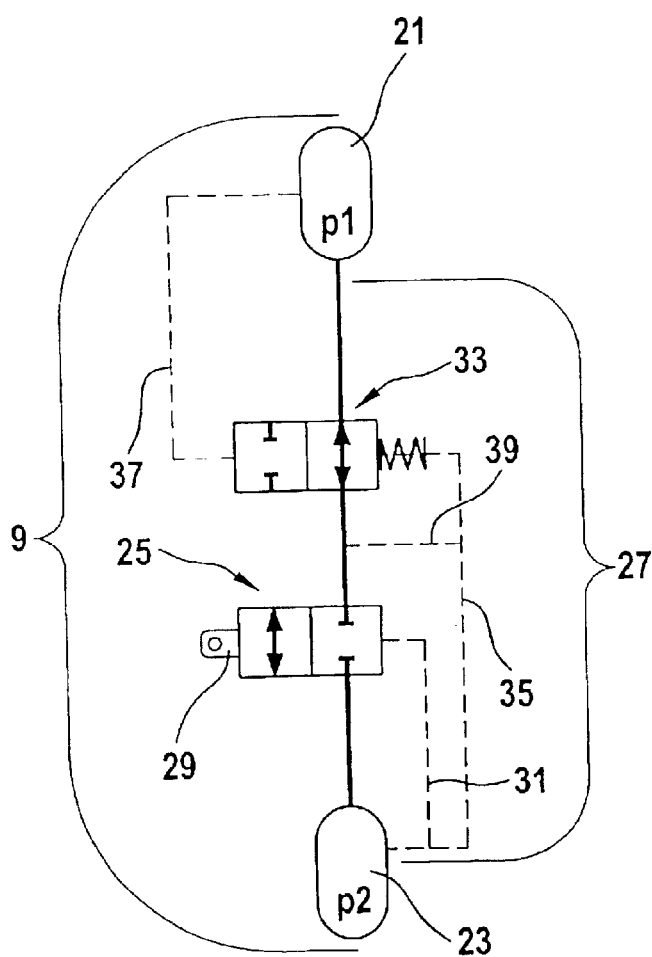
FIG. 3 is a schematic representation of the piston/cylinder unit according to an embodiment of the present invention.
Figure 5:
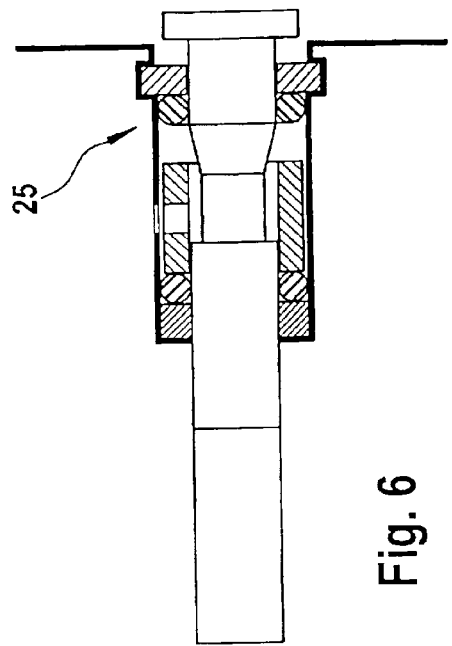
FIG. 5 is a sectional view of another embodiment of the piston/cylinder unit according to the present invention in the unloaded condition and with the valve closed.

Referring now also to FIGS. 3 and 5, the piston includes an on-off valve 25 which inhibits or enables a flow connection system 27. The on-off valve 25 is activatable by an activation push-rod 29 in association with the activation device 11. In the inhibited condition of the flow connection system 27, movement of the piston rod 15 relative to the cylinder 13 is restrained by the forces within the gas spring. The instantaneous pressure p1 in the working space 21 on the piston-rod side multiplied by the annular space area of the working space 21, i.e., the area of the piston exposed to the pressure p1, and the instantaneous pressure p2 in the working space 23 remote from the piston rod multiplied by the total piston area which is exposed to pressure p2, represent equally large forces which act in opposite directions. In consequence, the pressure p1 in the working space 21 on the piston-rod side must be greater than the pressure p2 because the area of the piston exposed to pressure p1 is smaller than the area of the piston exposed to pressure p2. If the on-off valve 25 is brought into a through-passage position, a pressure balance takes place between the working spaces. However, it is possible for a trivial pressure difference to occur between the working spaces 21, 23 because of the throttling effect within the flow connection system 27.

As previously described, the pressure difference between the two working spaces 21, 23 is determined by the area ratio between the surfaces exposed to the pressure. If load is applied to the gas spring, i.e. the working space 23 remote from the piston rod is more strongly compressed by the piston rod acting in the retraction direction, the pressure ratio changes as a deviation between the surfaces exposed to the pressure. As a function of the load, the case occurs that the working space remote from the piston rod 23 has a larger pressure than that of the working space 21 on the piston-rod side, depending on the cross-sectional area of the piston rod, which determines the pressure difference between the two working spaces.

FIG. 3 is an equivalent schematic representation of the gas spring 9 of FIG. 2. The two reservoirs represent the working spaces 21, 23 and the on-off valve 25 is embodied as a 2/2-way valve which is preloaded in the closing direction by a control line 31, starting from the pressure in the working space 23 remote from the piston rod. The on-off valve 25 is selectively activatable by the activation push-rod 29.

A load-dependent valve 33, also embodied as a 2/2-way valve, is movable into a through-passage position by a first control pressure connection 35. The load-dependent valve 33 is arranged between the two working spaces 21, 23 in the flow connection system 27. The load-dependent valve 33 may be brought into the closed position by a control force which may for example, be provided by an electromagnetic solution. Alternatively, the control force may also by provided by a spring. It is, however, also possible for the load-dependent valve to have a second control pressure connection 37, which is in connection with the working space 21 on the piston-rod side.

The following describes a mode of operation of the on/off valve valve 25 and the load-dependent valve 33. In the unloaded condition of the gas spring, the pressure p1 in the working space 21 on the piston-rod side is greater than the pressure p2 in the working space 23 remote from the piston rod. In consequence, the load-dependent valve 33 equipped with first and En second control pressure connections 35, 37 remains in an inhibiting position. If the on-off valve is brought into the through-passage position by the user via the activation device 29, the pressure medium can then only build up a working pressure in a flow duct 39 as far as the load-dependent valve. The two working spaces 21, 23 continue to be separated.

When the gas spring is applied on a seat back as shown in FIG. 1, the gas spring is loaded when a user leans back on the seat back. Therefore, if the seated user is leaning forward, no load is placed on the seat back and the movement of the gas spring remains inhibited, thereby preventing any seat back displacement and also the unpleasant contact of the seat back on the user's back can occur either.

If, on the other hand, the seat back is loaded, the pressure level in the working space 23 remote from the piston rod rises above the pressure level in the working space 21 on the piston-rod side so that the load-dependent valve 33 is brought into the through-passage position. If the on-off valve 25 is now actuated, the whole of the flow connection system 27 between the working spaces 21, 23 is opened and the piston rod 15 movement is enabled i.e. the seat back can move relative to the seat carrier. By means of the load-dependent valve, it is possible to "sense" whether the user is leaning on the seat back with a force sufficient to prevent the unpleasant contact. The same effect can be achieved, in association with a return spring, by the single-sided control pressure connection from the working space 23 remote from the piston rod. However, certain inaccuracies in the determination of the minimum load can occur when a spring is used during very large temperature fluctuations because of the temperature behavior of the gas or hydraulic fluid used to fill the working chambers.

Figure 4:
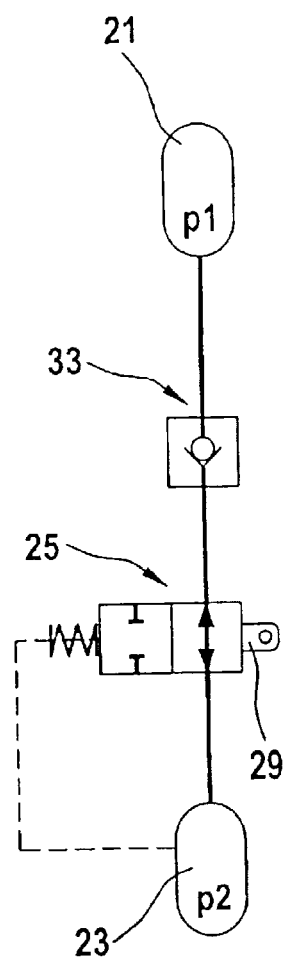
FIG. 4 is a schematic representation of the piston/cylinder unit according to another embodiment of the present invention.

The equivalent schematic representation of FIG. 4 corresponds, in its mode of operation, to the embodiment shown in FIG. 3. The difference being that the load-dependent valve 33 in the FIG. 4 embodiment is formed by a simple non-return valve. Use is made of the condition for the presence of a load on the gas spring that the pressure p2 in the working space 23 remote from the piston rod must be greater than the pressure p1 in the working space 21 on the piston-rod side. If the pressure p2 is smaller, the non-return valve is closed by the pressure p1 in the working space 21 on the piston-rod side. The valve construction is simplified overall in comparison with the embodiment of FIG. 3.

The technical implementation of the present invention in an exemplary embodiment is explained with reference to FIGS. 5 to 8. The piston 17 is represented by a separating line in FIGS. 5–8. For brevity and clarity, the illustrations dispense with representation 20 of the piston rod in favor of the activation push-rod 29 which is inside the piston rod. The working space 21 on the piston-rod side begins to the left of the separating line 17.

The on-off valve 25 includes a casing 41 which is firmly connected to the piston rod 15 (the piston rod is not shown in FIGS. 5–8). The activation push-rod 29, which is a two part device including an activation push-rod 29 and a valve push-rod 43, is arranged so that it can move axially within the casing 41. The valve push-rod 43 features a reduction area 45. The side of the reduction area facing the working space 23 remote from the piston rod merges with a uniformly cylindrical section 47 of the push rod 43. A stop 49 is arranged at the opposite end of the cylindrical section 47 from the reduction area 45. The stop 49 contacts a stationary retention disk 51 which is fixedly held in the valve casing 41 when the valve push-rod 43 is in the closed position. The instantaneous operating pressure p2 in the working space 23 remote from the piston rod acts on the stop 49 with the cross section of the cylinder section 47 subjected to the pressure when the valve push-rod 43 is in the closed position. The retention disk 51 is arranged in the casing 41 such that the medium in the working spaces 21, 23 can flow around the retention disk at its inner and outer diameters. To prevent leaks, the on-off valve 25 features a stationary seal 53 and a switching seal 55 which can move axially over at least a region of its periphery. A valve sleeve 57 is arranged between the stationary seal 53 and the switching seal 55. End-face recesses may be provided in the valve sleeve 57 and a region of the periphery of the seal may then be deformed into these recesses. The flow connection system 27 extends from the working space 23 remote from the piston rod, along the retention disk 51 as far as the switching seal 55 and, from there, out over the reduction area 45 through at least one radial opening 59 within the casing 41.

FIG. 5 shows the operating condition in which the on-off valve 25 is closed by the valve push-rod 43, i.e., the stop 49 is in contact with the retention disk 51, and no load acts on the gas spring. The instantaneous operating pressure between the switching seal 55 and the retention disk 51 is, corresponding to the pressure in the working space 23 remote from the piston rod, smaller than the instantaneous operating pressure between the radial opening 59 and the switching seal 55. In consequence, the switching seal 55, which exercises a sealing function at its inner and outer diameters contacts the retention disk 51 because of the higher pressure level in the working space 21 on the piston-rod side and is therefore found outside the reduction area 45 in the valve push-rod. In consequence, the flow connection system 27 between the two working spaces 21, 23 is completely inhibited.

Figure 6:
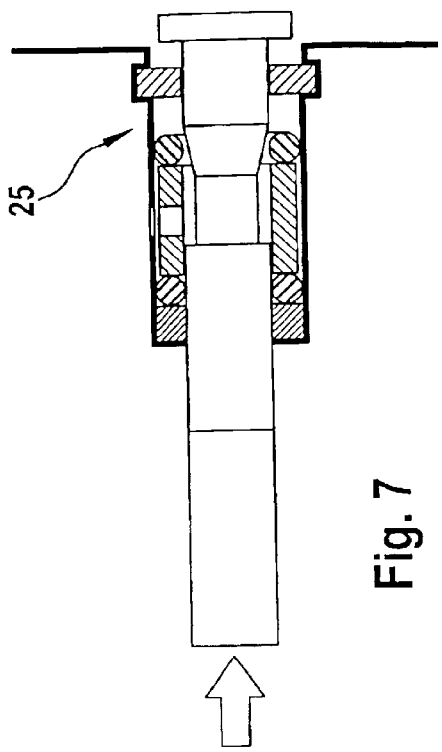
FIG. 6 is a sectional view of the piston/cylinder unit of FIG. 5 in the loaded condition and with the valve closed.

FIG. 6 represents the condition in which the on-off valve 25 is actuated without external load applied to the gas spring 9. Although the stop 49 of the valve push-rod 43 lifts from the retention disk 51, the switching seal 55 continues to be pressed against the retention disk 51 by the higher pressure in the working space 21 on the piston-rod side. Accordingly, the switching seal 55 is located on the valve push-rod 43 in the cylindrical section 47 and therefore the inner and outer diameters of the switching seal 55 provide a seal between the two working spaces 21, 23. The pressure medium is allowed to flow via the flow duct 39 (see FIG. 3) to the switching seal 55. However, the piston-rod movement remains inhibited. The switching seal 55, in association with the cylindrical section 47 of the valve push-rod 43, forms the load-dependent valve 33 which, together with the on-off valve 25, represents a structural unit.

Figure 7:
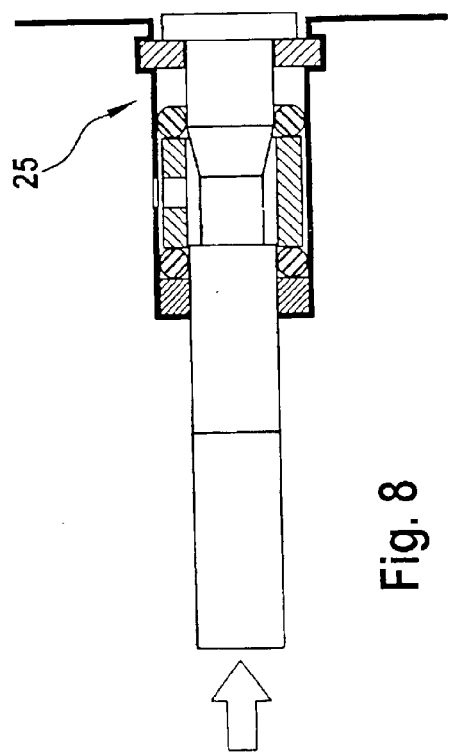
FIG. 7 is a sectional view of the piston/cylinder unit of FIG. 5 in the loaded condition and with the valve in the open position.

An external load on the piston rod of the gas spring 9 is symbolized by an arrow in FIG. 7. The pressure relationships in the working spaces 21, 23 change in response to the applied load such that the pressure p2 in the working space 23 remote from the piston rod rises as compared with the working space 21 on the piston-rod side. If the pressure p2 in the working space 23 remote from the piston rod is greater than that in the working space 21 on the piston rod side, the seal is displaced toward the reduction area 45 by the pressure p2 in the working space 23 remote from the piston rod and the pressure medium is then allowed to pass between the switching seal 55 and the reduction area 45 into the working space 21 on the piston-rod side when the on-off valve 25 is open so that movement of the piston rod is enabled.

Figure 8:
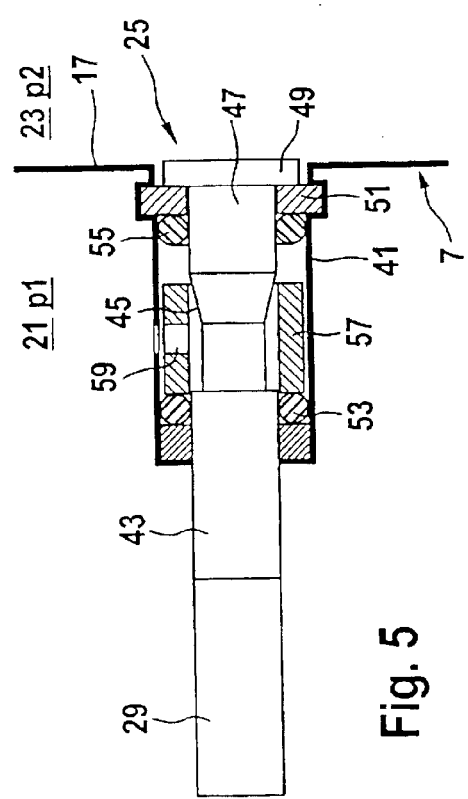
FIG. 8 is a section view of the piston/cylinder unit of FIG. 5 in the unloaded condition and with the valve open.

The condition in which the gas spring 9 is, in fact, loaded but the on-off valve 25 is not actuated is represented in FIG. 8. The cylindrical section 47 of the valve push-rod 43 between the reduction area 45 and the retention disk 51 is dimensioned longitudinally such that although the switching seal 55 executes a switching motion in the direction of the through-passage position, i.e., toward the reduction area 45 in response to the pressure relationships, it contacts the valve sleeve 57 before it reaches the reduction area 45, and fails to define a through-passage position of the flow connection system 27.

The embodiment of the invention shown in FIGS. 5 to 8 corresponds, in its mode of operation, to the equivalent schematic representation of FIG. 4 because the switching seal 55 has the function of a non-return valve. In consequence, the complete load-dependent valve 33 can be regarded as a non-return valve.

Figure 9:
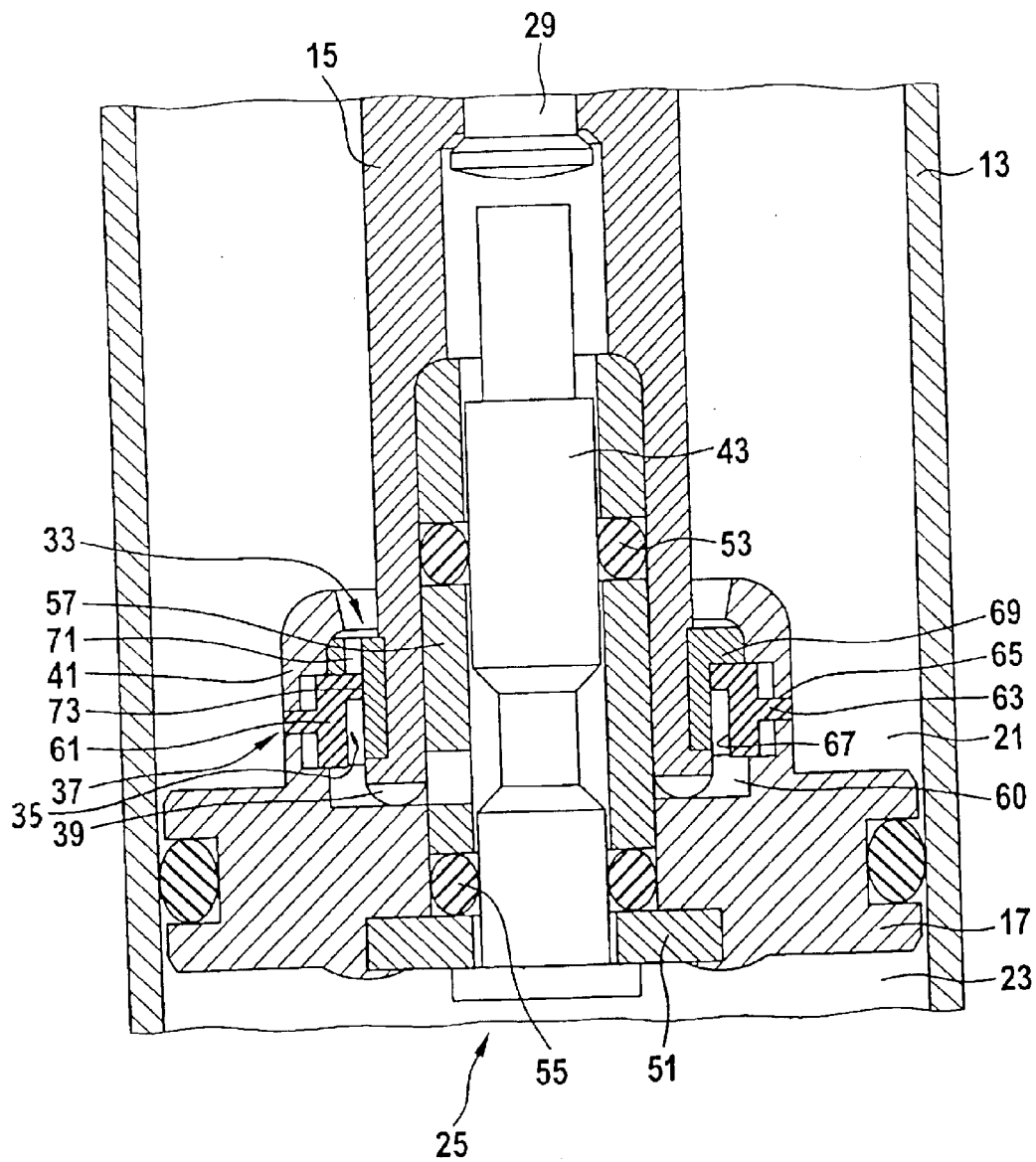
FIG. 9 is a partial sectional view of yet another embodiment of the piston/cylinder unit according to the present invention.

The equivalent schematic representation of FIG. 3 is realized in FIG. 9. In this embodiment the seal 55 associated with the retention disk 51 is not movable and is clamped between the valve sleeve 57 and 55 the retention disk 51 and seals on its inner and outer diameters. Since the seal of FIG. 9 embodiment does not move in response to load, it is of no importance whether the front and rear sides of the seal are subjected to the working pressures.

The flow duct 39 between the on-off valve 25 and the load-dependent valve 33 opens into an annular space 60. The load-dependent valve 33 is embodied as a radially flexible ring 61. Sealing pins 63 of the flexible ring 61 engage in openings 65 in the casing 41 and are subjected to the pressure p1 in the working space 21 on the piston-rod side.

The end surfaces of the sealing pins 63, in association with the openings 65, represent the second control-pressure connection 37 for the load-dependent valve 33. An internal surface 67 of the flexible ring 61 faces the annular space 60 and forms the first control-pressure connection 35, whose direction of action is opposed to that of the second control-pressure connection. A number of valve openings 71 are machined into a valve ring 69. The valve openings 71 are selectively blocked or opened by a peripheral valve protrusion 73 of the flexible ring 61 as a function of the pressure relationships in the annular space 60 and on the end surfaces of the sealing pins 63. This occurs because the flexible ring can execute a radial widening motion from the position shown in FIG. 9 and the valve protrusion 73 frees the valve openings 71.

The use of the load-dependent valve is not limited to the examples described herein. Furthermore, the arrangement of the load-dependent valve is in no way limited to an association with a piston.

In the embodiment represented, the opening forces are determined by the area relationships between the working spaces and the area relationships at the control-pressure connections. The opening forces on the load-dependent valve may be determined independently of the area relationships by the employment of springs in the working spaces and/or on the load-dependent valve. For example, a spring element may be inserted between the switching seal 55 and the retention disk 51 or the flexible ring 61 may be preloaded in the radial direction by a spring.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A piston/cylinder unit having a selectively inhibited movement, comprises:
   a cylinder filled with a hydraulic medium;
   a piston arranged on a piston rod and dividing said cylinder into working spaces;
   a flow connection system having a flow connection arranged between said first and second working spaces;
   an on-off valve arranged in said flow connection system and having a movable valve element, wherein said valve opens said flow connection as a function of a position of the movable valve element; and
   a load-dependent valve arranged in said flow connection system in series with said on-off valve for inhibiting complete flow through said flow connection independently from said on-off valve when a load on the piston/cylinder unit is lower than a non-inhibiting load, wherein said load-dependent valve has a control pressure connection to each of said first and second working spaces, the control pressure connections acting in opposite directions on said load-dependent valve.

2. The piston/cylinder unit of claim 1, wherein said load-dependent valve and said on-off valve are combined to form a structural unit.

3. The piston/cylinder unit of claim 1, wherein said on-off valve comprise a flow duct emerging as a section of the flow connection at said control pressure connection of said load-dependent valve.

4. The piston/cylinder unit of claim 1, wherein said on-off valve comprise a flow duct emerging as a section of the flow connection at said control pressure connection of said load-dependent valve.

5. The piston/cylinder unit of claim 1, wherein said load-dependent valve comprises a non-return valve.

6. A piston/cylinder unit having a selectively inhibited movement, comprises:
   a cylinder filled with a hydraulic medium;
   a piston arranged on a piston rod and dividing said cylinder into working spaces;
   a flow connection system having a flow connection arranged between said first and second working spaces;
   an on-off valve arranged in said flow connection system and having a movable valve element, wherein said valve opens said flow connection as a function of a position of the movable valve element; and
   a load-dependent valve arranged in said flow connection system in series with said on-off valve for inhibiting complete flow through said flow connection independently from said on-off valve when a load on the piston/cylinder unit is lower than a non-inhibiting load, wherein said load-dependent valve and said on-off valve are combined to form a structural unit and control pressure connections act on opposing sides of said valve element of said load-dependent valve.

7. The piston/cylinder unit of claim 6, wherein said load-dependent valve has a control pressure connection to one of said first and second working spaces.

8. The piston/cylinder unit of claim 7, wherein said load-dependent valve has a control pressure connection to each of said first and second working spaces, the control pressure connections acting in opposite directions on said load-dependent valve.

9. The piston/cylinder unit of claim 8, wherein said on-off valve comprise a flow duct emerging as a section of the flow connection at said control pressure connection of said load-dependent valve.

10. The piston/cylinder unit of claim 7, wherein said on-off valve comprise a flow duct emerging as a section of the flow connection at said control pressure connection of said load-dependent valve.

11. The piston/cylinder unit of claim 6, wherein said valve element comprises a seal.

12. The piston/cylinder unit of claim 11, wherein said seal is axially movable relative to a longitudinal axis of said on-off valve.

13. The piston/cylinder unit of claim 6, wherein said load-dependent valve comprises a non-return valve.

* * * * *